US007721218B2

(12) United States Patent
Awe et al.

(10) Patent No.: US 7,721,218 B2
(45) Date of Patent: May 18, 2010

(54) MECHANISM FOR INTELLIGENT USER INTERFACE PRESENTATION OF A SOFTWARE AGENT

(75) Inventors: Jeffrey T. Awe, Rochester, MN (US); Joseph P. Bigus, Rochester, MN (US); Anthony M. Dunbar, Rochester, MN (US); Gregory R. Hintermeister, Rochester, MN (US); Jacob Kugel, Rochester, MN (US); Donald A. Schlosnagle, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2115 days.

(21) Appl. No.: 10/403,893

(22) Filed: Mar. 31, 2003

(65) Prior Publication Data

US 2004/0215710 A1    Oct. 28, 2004

(51) Int. Cl.
G06F 3/00 (2006.01)
G06F 9/00 (2006.01)
G06F 17/00 (2006.01)

(52) U.S. Cl. ........................ 715/762; 715/760; 715/763; 715/764

(58) Field of Classification Search ................. 715/760, 715/764, 763, 762
See application file for complete search history.

(56) References Cited

U.S. PATENT DOCUMENTS

| | | | | |
|---|---|---|---|---|
| 5,920,848 | A * | 7/1999 | Schutzer et al. | 705/42 |
| 6,088,689 | A | 7/2000 | Kohn et al. | |
| 6,427,142 | B1 * | 7/2002 | Zachary et al. | 706/49 |
| 6,446,054 | B1 * | 9/2002 | Mayorga Lopez | 706/2 |
| 6,845,370 | B2 * | 1/2005 | Burkey et al. | 707/3 |
| 2002/0178395 | A1 | 11/2002 | Chen et al. | |
| 2003/0074222 | A1 * | 4/2003 | Rosow et al. | 705/2 |
| 2004/0075692 | A1 * | 4/2004 | Matichuk | 345/806 |
| 2004/0205034 | A1 | 10/2004 | Bigus et al. | |
| 2005/0091118 | A1 * | 4/2005 | Fano | 705/26 |
| 2005/0177792 | A1 | 8/2005 | Awe et al. | |

OTHER PUBLICATIONS

Karl-Fredrik Blixt and Rickard Oberg, "Software Agent Framework Technology", Mar. 9, 2000.
Bjorn Hermans, http://www.firstmonday.dk/issues/issue2_3/ch_123, "Intelligent Software Agents on the Internet: An Inventory of Currently Offered Functionality in the Information Society and a Prediction of (Near) Future Developments", printed Jan. 29, 2003.
Douglas C. Smathers and Steven Y. Goldsmith, "Agent Concept for Intelligent Distributed Coordination in the Electric Power Grid", printed Mar. 2001.
James Ingham, "What is an Agent?", Technical Report #6/99 (orinigally written in 1997), pp. 1-16.
David Musliner and Barney Pell, "Agents with Adjustable Autonomy", Technical Report SS-99-06, Papers from the 1999 AAA1 Spring Symposium.
Robyn Kozierok, "MITRE IMP Developers' Guide", Last updated Apr. 6, 1999.

* cited by examiner

*Primary Examiner*—Tadesse Hailu
*Assistant Examiner*—Anita D Chaudhuri
(74) *Attorney, Agent, or Firm*—Patterson & Sheridan, LLP (57) ABSTRACT

The present invention generally relates to intelligent software agents. Agents are interfaced with through user interfaces that are generated according to the agent's intelligence. In one aspect, the interfaces are dynamically and programmatically generated in response to a request from a user desiring to interface with a particular agent. In this way, the interface may be generated in real time according to the applied intelligence of the agent. Interfaces may also be updated periodically and, in this way, be available prior to a user's request.

7 Claims, 10 Drawing Sheets

MECHANISM FOR INTELLIGENT USER INTERFACE PRESENTATION OF A SOFTWARE AGENT

CROSS-REFERENCE TO RELATED APPLICATIONS

This application is related to U.S. Ser. No. 10/403,649, filed on Mar. 31, 2003 by Bigus et al, and entitled "COMMUNICATION BETWEEN INTELLIGENT AGENTS AND HUMANS IN A DISTRIBUTED SYSTEM ENVIRONMENT", herein incorporated by reference in its entirety.

BACKGROUND OF THE INVENTION

1. Field of the Invention

The present invention generally relates to intelligent agents, and more particularly to the creation and/or configuration of such agents.

2. Description of the Related Art

The automation of tedious and complex tasks has long been a goal of computer science. In this regard, intelligent agents have attracted significant attention in recent years. Generally, an agent is a computer system or software program that supports a user with accomplishment of some task or activity. Intelligent software agents may be characterized as long-running processes that monitor information concerning their environment via events or polling, process that information using procedural or declarative domain knowledge, and then take actions to respond to situations detected in their environment.

Although the theorized potential of agents remains largely untapped, some degree of utility has been achieved. For example, on the Internet an agent is a program that gathers information or performs some other service on a regular schedule and without the immediate presence of a human user. Typically, an agent program, using parameters provided by a user, searches all or some part of the Internet gathering information of interest to the user, and then presents it to the user on a periodic basis. A particular example of an agent is the email service that alerts the user about news on specified topics of interest. A number of similar agents compare shopping prices and bring the results of the comparison back to the user. Other types of agents include specific site watchers that tell users when the site has been updated or look for other events and analyst agents that not only gather but also organize and interpret information.

The creation and subsequent customization of agents is facilitated by toolkits. One such toolkit is IBM's ABLE™ (Agent Building and Learning Environment) toolkit. The toolkit includes one or more panels providing a host of graphical elements and menu options from which a user may select to configure agents. For example, a System Administration agent may need to know the e-mail address of who to contact in the event of a problem, or a Storage Management agent may need to know the minimum amount of free disk space allowed before taking action. Using a toolkit, a user can configure the agents with the needed information in order for the agent to carry out its tasks.

One shortcoming of the state of the art is that the interface through which users (or other entities such as other agents) interact with an agent is static. That is, the same interface is provided to a user each time the agent's interface is invoked. This is true even though the agent's environment may dictate that some elements are not relevant or that some other element not defined for the interface may be more relevant. For example, consider a storage monitoring agent that learns that storage requirements increase during a certain time of day. A customization panel of the user interface for the storage monitoring agent would preferably ask a user for permission to temporarily move disk space from another partition during the peak storage use period, and the allow the user to specify an amount of storage to move. However, because agent user interfaces are statically defined, such options are not provided to the user unless the options are part of the interfaces original static definition. No mechanism to dynamically apply an agent's intelligence to an interface exists.

Therefore, there is a need for a mechanism to dynamically apply an agent's intelligence to an interface for the agent.

SUMMARY OF THE INVENTION

The present invention generally provides methods, apparatus and articles of manufacture generating user interfaces for intelligent software agents.

One embodiment provides a method of providing user interfaces for interfacing with intelligent software agents. The method includes receiving a first request for an agent user interface for a particular intelligent software agent; and programmatically generating the user interface according to information learned by the particular intelligent software agent, wherein the user interface provides a plurality of agent configuration elements for configuring the particular intelligent software agent.

Another method provides real-time user interfaces for configuring an intelligent software agent. The method includes programmatically generating an agent user interface for the intelligent software agent based on a current state of the intelligent software agent, whereby each subsequently generated agent user interface for the intelligent software agent may be different than a previously generated agent user interface for the intelligent software agent.

Yet another embodiment provides a computer readable medium containing a program which, when executed, performs a user interface generation operation. The operation includes, in response to a first request for an agent user interface for a particular intelligent software agent: generating a user interface for the particular intelligent software agent according to information learned by the particular intelligent software agent, wherein the user interface provides a plurality of agent configuration elements for configuring the particular intelligent software agent.

Still another embodiment provides a computer having an intelligent software agent and a user interface generator. The user interface generator is configured to programmatically generate, in response to a request, a user interface configuration panel based on a state of the intelligent software agent at a time the request is received, wherein the user interface configuration panel includes a plurality of features for configuring the intelligent software agent.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Aspects of the present invention generally relate to dynamic programmatic generation of interfaces for intelligent software agents. Interfaces are defined dynamically and programmatically according to a state of an agent. A "state" of an agent generally refers to the current definition of the agent including its internal attributes and characteristics which define its behavior. The state changes with time as the agent interacts with its environment and learns as a result of such interaction. Accordingly, each invocation of an interface for a given agent may be different from previous invocations. In general, the number of available fields of a panel may increase or decrease different between instances. In addition, the fields may be the same or different between instances. In one embodiment, the interface for an agent is generated in real-time when the interface is requested. Alternatively, the interface may be reformatted periodically according to updated intelligence of an agent. In the latter embodiment, the interface may pre-exist a user's request for the interface, but in either embodiment the interface changes over time according to the evolving intelligence of an agent. Further, multiple interfaces from different agents may be merged into a single interface. The agents may be local or remote (i.e., distributed). As such, aspects of the invention are described in the context of a distributed system where agents are interfaced with (e.g., configured) remotely. However, dynamic generation of interfaces may be done even in a standalone system where agents may be interfaced with locally.

Other aspects of the present invention generally relate to remote configuration of intelligent software agents. Each agent has an associated user interface panel through which the agent may be configured/customized. A remotely located user desiring to configure a particular agent issues a request for the associated user interface customization panel. The user interface panel may be provided to the user via, for example, a network connection. The user may then make the desired changes to the agent via the user interface panel. In this way, remote configuration of an agent is possible.

As used herein, an "interface" generally refers to a generic mechanism that allows interaction between an agent and another entity. An interface may include any variety of features for configuring an agent. The other entity with which an agent interacts via an interface may be, for example, a user or another agent. Embodiments of the present invention are described with reference to dynamically and programmatically generated user interfaces (also referred herein as "panels"), which allow interaction between agents and users. However, the dynamic programmatic generation of interfaces that facilitate interaction between agents and other entities is also contemplated.

"Programmatically" generally means being accomplished without further user input. Thus, in contrast to prior art, programmatically generated panels are composed by a program rather than by user selections. The program responsible for generating the panel may itself be the agent corresponding to the panel.

In at least one embodiment, an intelligent software agent is a software element configured to detect a situation (e.g., problem or problems) and take steps to address the situation (i.e., correct the problem). The agent may also be configured to identify one or more courses of action (e.g., solutions) to be taken in response to the situation. In a particular embodiment, an agent is a continuously running element (i.e., not a single computation that maps a single input a single-output and then terminates) that is characterized as being autonomous, reactive, and pro-active. "Autonomy" generally refers to the ability to act without direct intervention from humans or otherwise. Autonomy may further refer to an agent having control over its internal state. "Reactive" generally means being capable of maintaining an ongoing interaction with the environment, and responding timely to changes occurring within the environment. "Pro-active" generally refers to the capability of taking the initiative, and generating goals and acting rationally to achieve them. Pro-active may further imply that the agent is not solely event-driven. An intelligent software agent may also be characterized as collaborative (i.e., having the ability to modify requests, ask for clarification or even refuse certain requests), communicative (i.e., able to engaging complex communication with other entities, such as agents and human beings, to facilitate accomplishment of its goals), flexible (i.e., having the ability to choose which actions to invoke in response to the state of its external environment), mobile (i.e., able to transport itself from one machine to another across different system architectures and platforms) and adaptive (i.e., capable of automatically customizing itself based on previous experience and changes in its environment). However, it is understood that the foregoing agent characteristics are merely illustrative and agents of the present invention need not exhibit all of these characteristics and may exhibit others.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored thereon. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
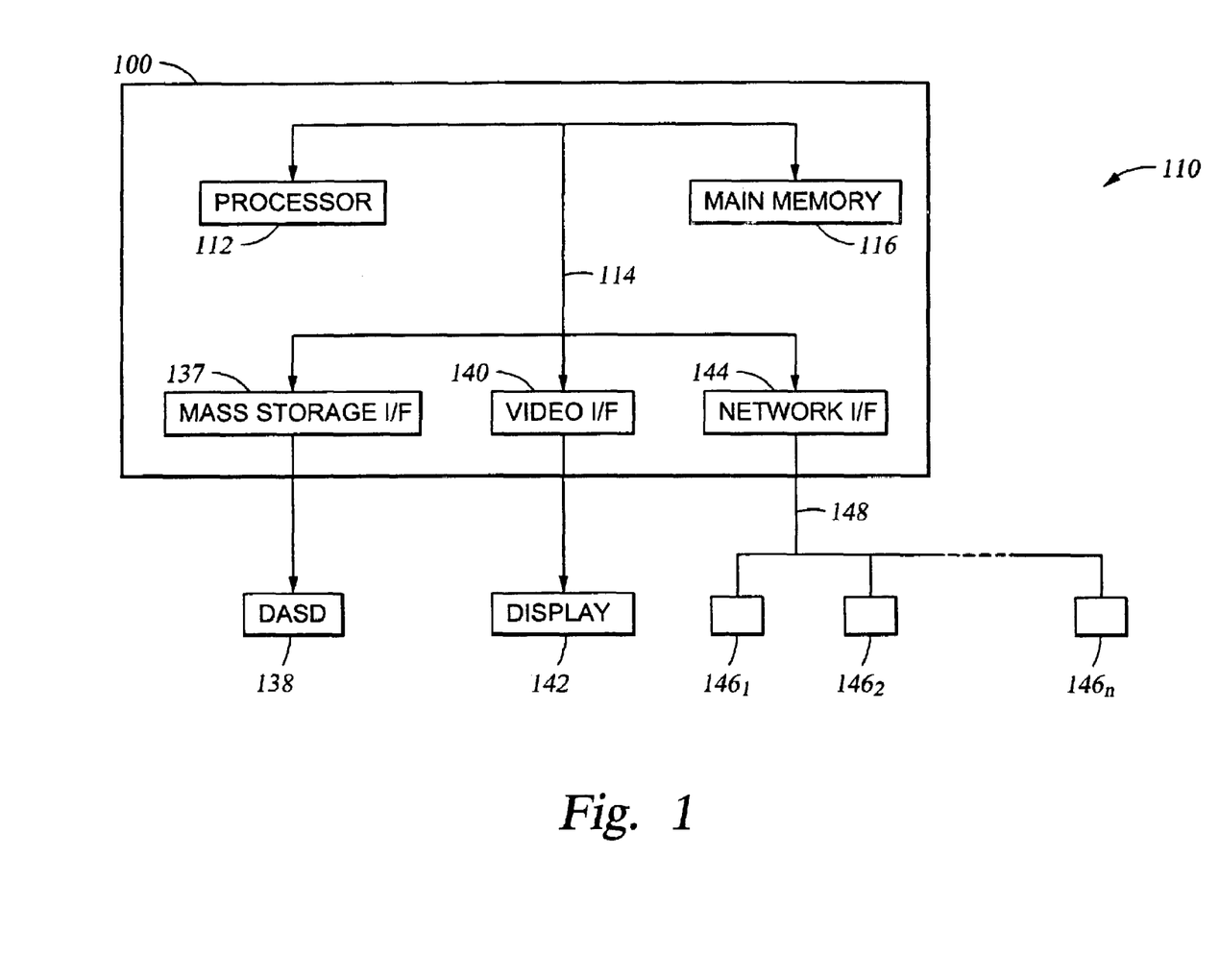
FIG. 1 is an exemplary computer system in which aspects of the invention may be implemented.

FIG. 1 shows a computer 100 (which is part of a computer system 110) that becomes a special-purpose apparatus according to an embodiment of the invention when configured with the features and functionality described herein. The computer 100 may include any electronic device having at least one processor, and may be a standalone device or part of a network. Some suitable examples of a computer 100 are a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. The term "computer system" shall generally refer to one or more computers 100 coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer 100 could include a number of operators and peripheral systems such as, for example, a mass storage interface 137 operably connected to a storage device 138, a video interface 140 operably connected to a display 142, and a network interface 144 operably connected to the plurality of networked devices 146 (which may be representative of the Internet). Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer 100 via bus 114. Thus, main memory 118 and storage device 134 could be part of one virtual address space spanning multiple primary and secondary storage devices.

Figure 2:
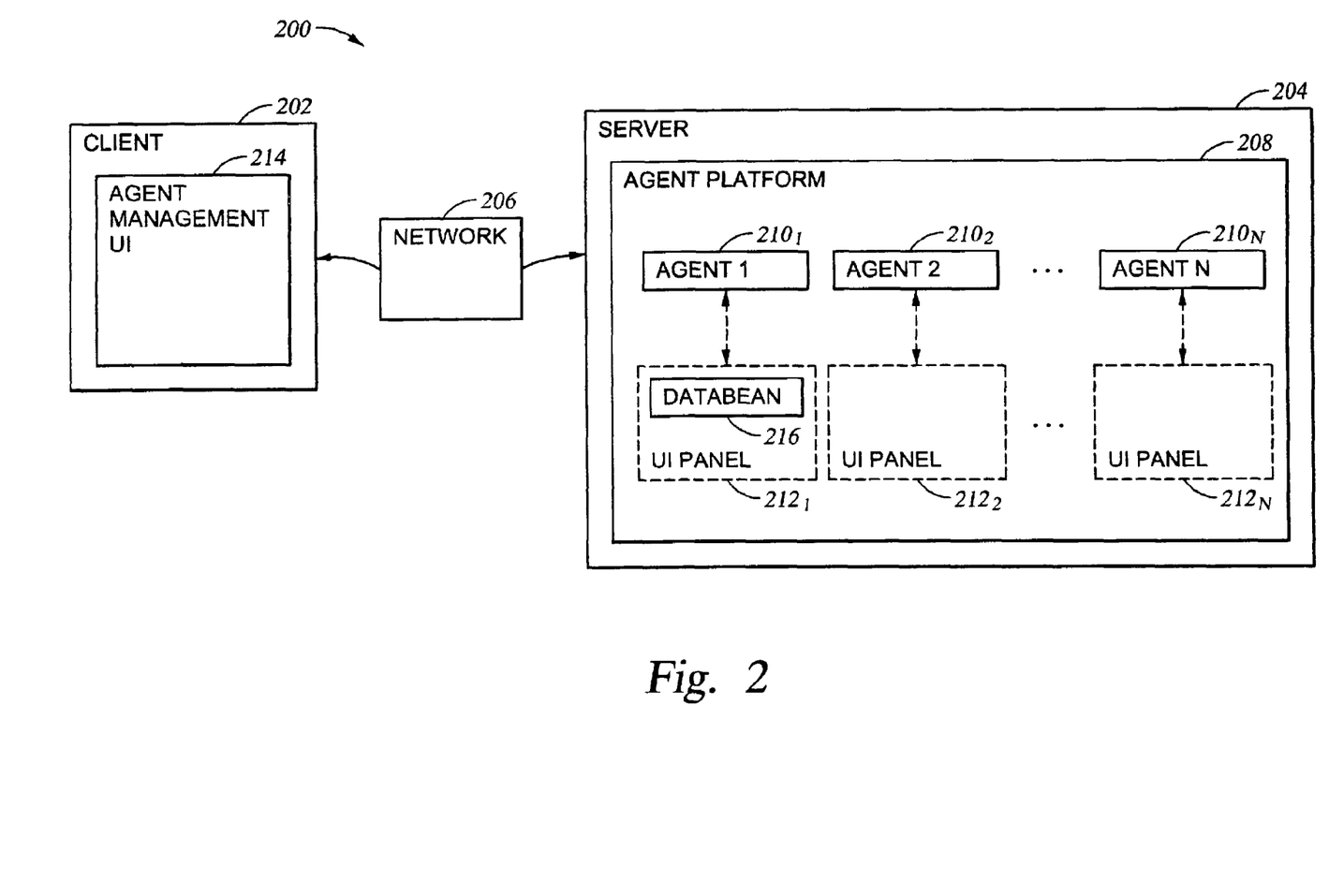
FIG. 2 is a block diagram of one embodiments of the invention implemented in a distributed system.

FIG. 2 is a distributed system 200 which may be implemented on the computer system 110 of FIG. 1. Illustratively, the distributed system 200 is a client-server system. However, the invention may be implemented in any distributed system where agents are configured remotely.

Generally, the distributed system 200 includes a client 202 and a server 204, each of which may be representative of computers or executing processes. Although only a single client 202 is shown for simplicity, more typically a plurality of clients communicates with the server 204. The client 202 and server 204 communicate via a network 206. The network 206 may be, for example, a local area network (LAN) or a wide area network (WAN). Accordingly, any variety of well-known or unknown protocols and supporting hardware may be used to allow communication between the client 202 and the server 204 via the network 206. In a particular embodiment, the network 206 is the Internet and communication is achieved using TCP/IP.

The server 204 provides a host environment for an agent platform 208. In one embodiment, the agent platform 208 is ABLE available from International Business Machines, Inc. More generally, the agent platform 208 may be any environment supporting a plurality of intelligent software agents $210_{1-N}$ (collectively, intelligent software agents 210). Each agent 210 is configured to perform a specific task or tasks. In the performance of its task(s) an agent may communicate with other agents, with the server and with a variety of other processes. In any case, it may be necessary or desirable to configure/customize an agent from time to time. Configuring or customizing, as used herein, refer interaction with an agent with the effect of changing attributes of the agent (i.e., changing metrics considered relevant by the agent, changing the response an agent takes in response to a situation, etc.) and/or to prompting the agent to take action to achieve a desired result. For example, customization commonly occurs when an agent is first instantiated. Once an agent has been placed into service, subsequent configuration may be necessary to adjust the behavior of the agent in response to particular situations or cause a desired action by providing input to an agent (e.g. via fields of an interface for the agent). As such, it is contemplated that the agents may be trained to behave in a particular manner in order to automate certain functions or collect data. U.S. patent application Ser. No. 10/403,649, entitled "COMMUNICATION BETWEEN INTELLIGENT AGENTS AND HUMANS IN A DISTRIBUTED SYSTEM ENVIRONMENT" describes embodiments for training agents, and is hereby incorporated by reference in its entirety. The agents may also learn from their environments and apply the accumulate intelligence according to aspects of the invention described herein.

Customization is generally facilitated by the provision of a user interface panel 212. Since customization may be unique between agents, each agent may be provided with its own user interface panel 212. The user interface panel 212 may be a panel definition described by a meta-language (such as HTML, XML, AUIML or any future mark up language) generally describing a layout of an interface as well as static elements of a panel such as text, labels, buttons and the like. In one embodiment, some of the settings (e.g., field values and radio button selections) of the panels may be given default values. Accordingly, when a panel 212 is rendered for display to a user, aspects of the panel may be populated/configured according to such default values. In one embodiment, the default values are stored in a data bean 216, as is shown with respect to one of the agents $212_1$ in FIG. 1. The data bean 216 and its contents may then be provided to a client upon request. Generally, the data bean 216 may be a Java class defining a plurality of methods for various fields of a panel. For each field there may be a method to get data from the field and a method to set data in the field. As represented by FIG. 1, not all agent panels need have associated data beans containing default values. However, it is contemplated that providing a data bean for each agent panel may facilitate communication between clients and the server/agent by serving as an acknowledgement of a client's request for default values, as will be described in more detail below. In any case, it is understood, that the use of a data bean 216 is merely illustrative of one embodiment and persons skilled in the art will recognize other embodiments with the scope of the invention.

The user interface panels 212 are represented with dashed lines because it is contemplated that the user interface panels 212 may be static, or dynamically generated at the time of a user request for the panel. The second panel $212_2$ is representative of a dynamically generated panel. A dynamically generated panel is generated by a panel generator 218. In one embodiment, a single panel generator is configured to generate panels for a plurality of agents. Alternatively, a separate panel generator may be provided for each agent. In the case of dynamic generation, the agent may intelligently consider existing environmental conditions in generating the panel. As a result, the definition of the panel may vary with each invocation. In one embodiment, the intelligence applied by an agent at the time of panel generation is provided by a learning engine 220. Illustratively, the learning engine 220 may be premised on neural networks, fuzzy logic, internal rule sets or the like. In any case, the learning engine 220 may acquire/generate intelligence as the agent interacts with its environment. This intelligence is then provided to the panel generator 218 (e.g., when a user requests a panel) in order to generate a meaningful interface which accounts for the agent's current state. One example of environment-dependent dynamic generation is described below with respect to FIG. 3 and FIG. 4.

In one embodiment, only a single panel 212 is provided for a given agent 210. In an alternative embodiment, two or more agents may share a common user interface panel 212. In yet another embodiment, a given agent may have an associated plurality of panels 212. For example, a given agent may have multiple panels 212 each specific to a particular device definition which defines, for example, a display format for the panel 212 on a client device. In this manner, the invention is adaptable to any device type having a display such as, for example, a PDA.

For simplicity, reference to a panel will generally be in the singular. However, the term "panel" will be understood to refer to one or more panels for configuring a particular agent.

Figure 3:
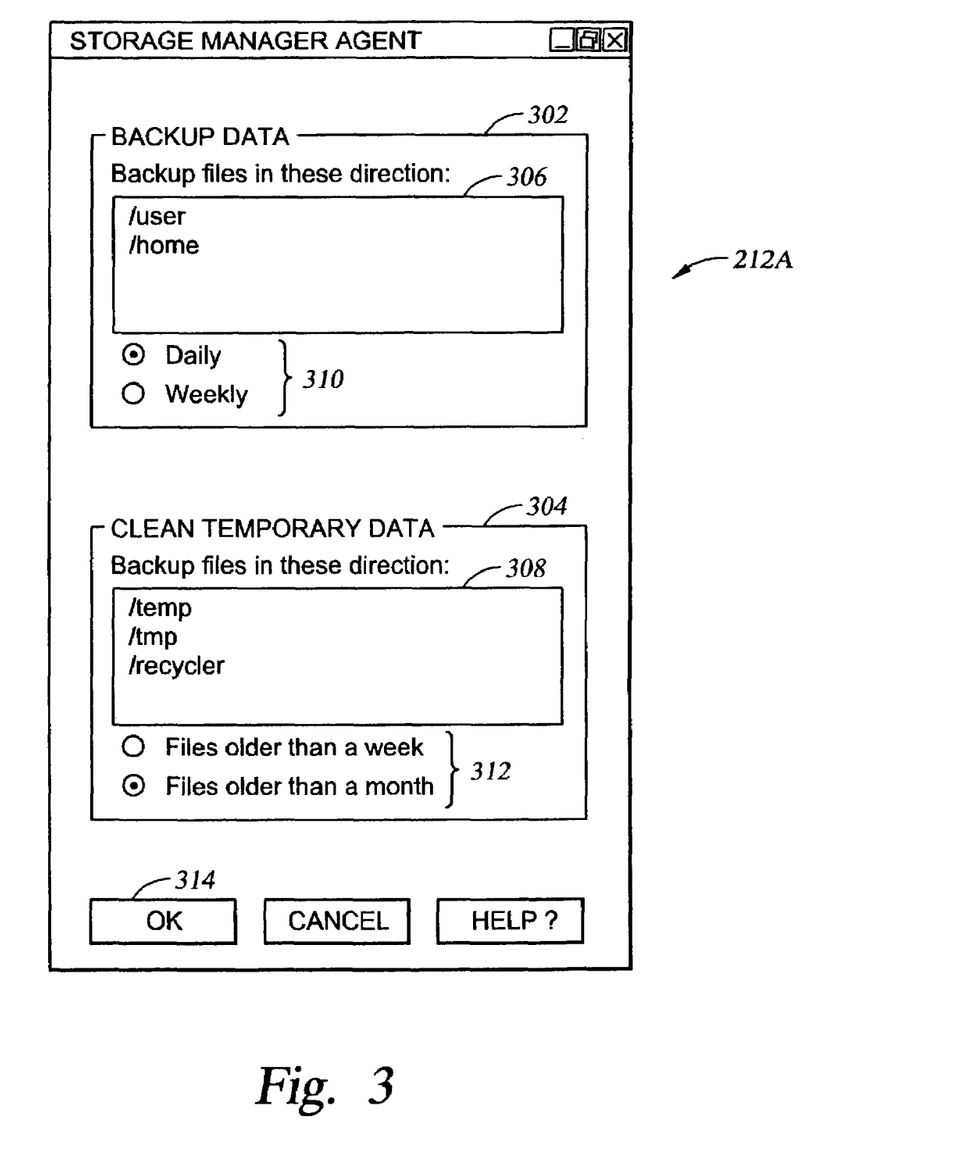
FIG. 3 is an illustrative customization panel for a storage manager agent.

In any case, each panel 212 includes user-configurable features for customizing a given agent. Referring briefly to FIG. 3, an illustrative representation of a panel 212A for a "Storage_Manager" agent is shown. In this illustration, the panel 212A includes "Backup Data" configuration settings 302 and "Clean Temporary Data" configuration settings 304. Each of the settings includes a field 306, 308 displaying the affected directories and radio buttons 310, 312 for establishing a trigger event (e.g., a predefined frequency or file age) the occurrence of which invokes the agent to perform its functions. Having made the desired settings, the user clicks the OK button 314 to implement the changes to the agent.

Figure 4:
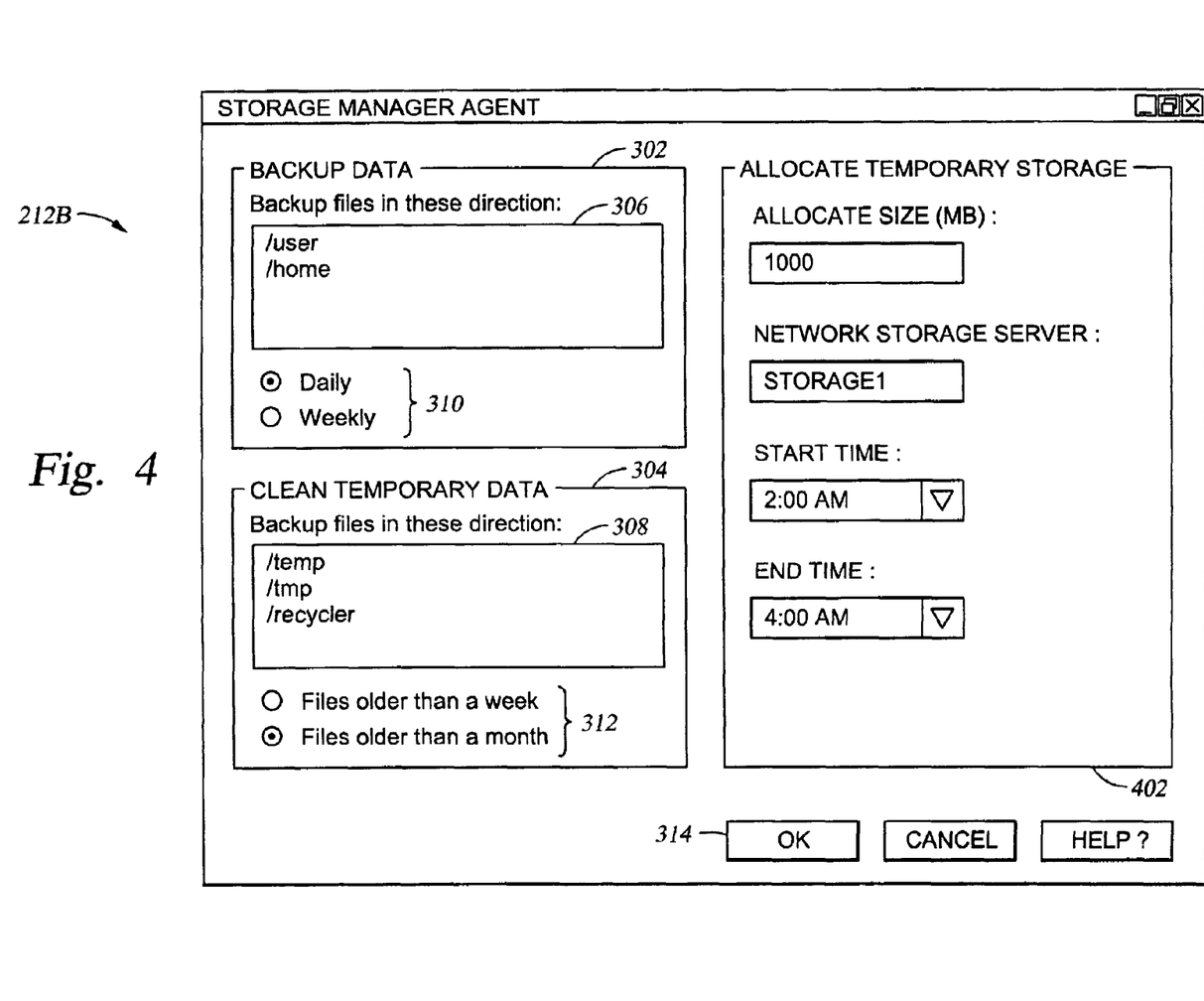
FIG. 4 is another illustrative customization panel for the storage manager agent.

As noted above, the panels 212 may be dynamically generated at the time of a user request to configure an agent. FIG. 4 shows another panel 212B for the "Storage_Manager" agent; the same agent for which the panel 212A the FIG. 3 was generated. As such, the two panels 212A-B share a variety of common features, specifically the "Backup Data" configuration settings 302 and the Clean Temporary Data" configuration settings 304. However, because the second panel 212 was generated at a later time, and under different circumstances, the second panel 212B also includes "Allocate Temporary Storage" configuration settings 402. Thus, the Storage_Manager agent applied its intelligence (acquired via the learning engine 220) to generate the second panel 212.

In operation, a request to customize a particular agent (i.e., a request for the agent's panel 212) is issued from the client 202. As such, the client 202 is configured with an agent management user interface 214. The agent management user interface 214 provides a simple portal from which a user may remotely issue that customization request. In a particular embodiment, the agent management user interface 214 is a web browser such as the Netscape browser. In this way, installation on the client side is kept to a minimum. In particular, since the panels 212 are resident only on the server 204, new installations of agents and their associated panels does not require installation of the associated panels on the client 202.

Figure 5:
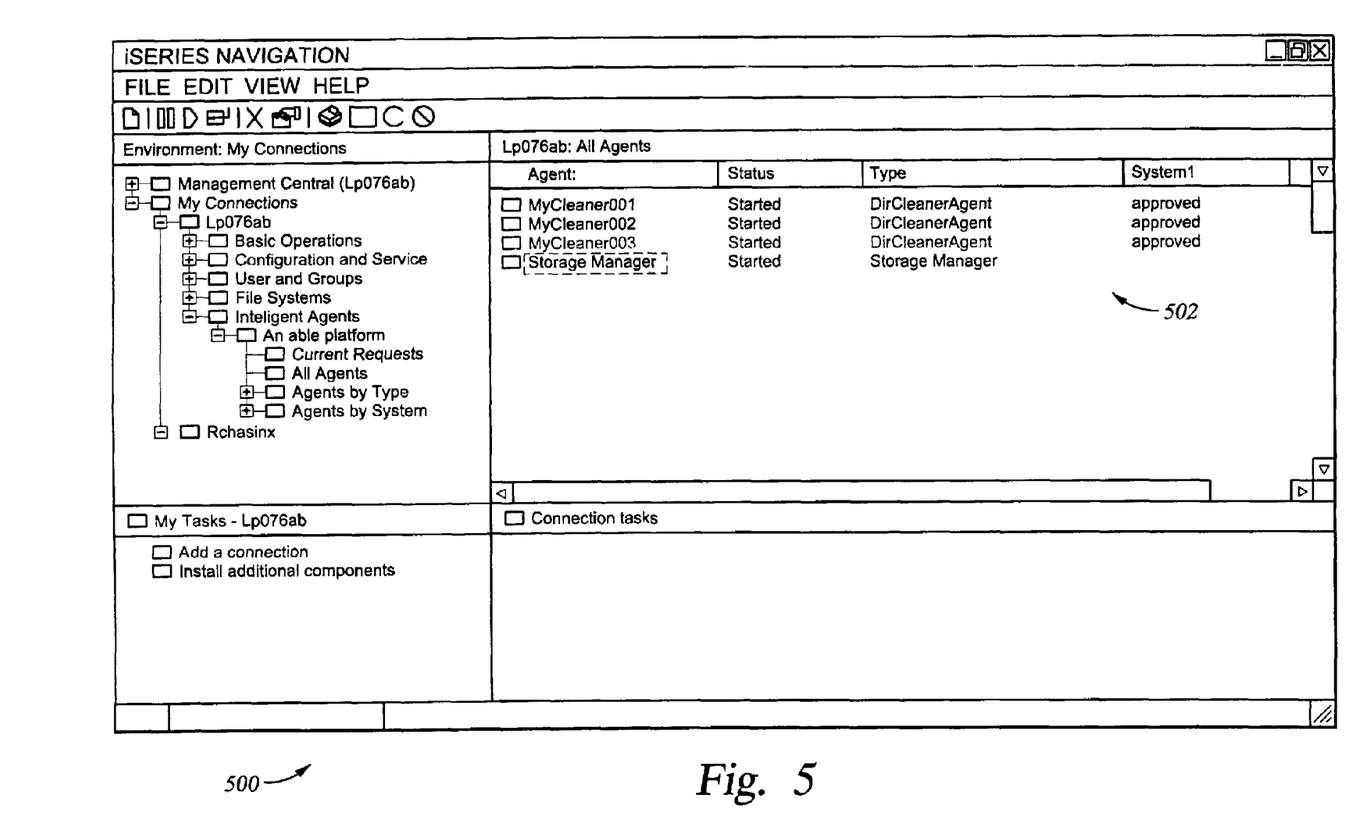
FIG. 5 is a main screen of an agent management user interface.
Figure 6:
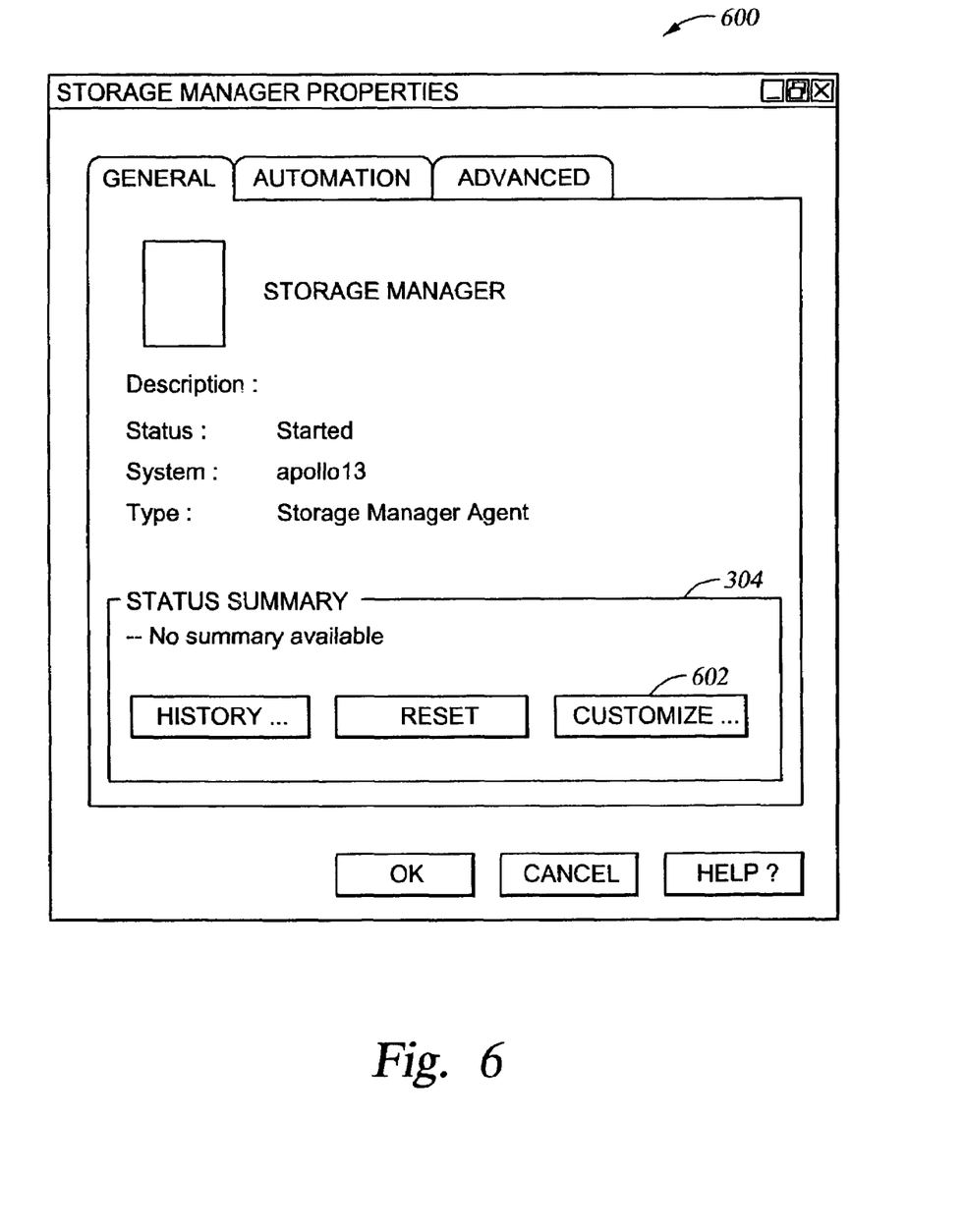
FIG. 6 is an agent properties dialog.

FIG. 5 shows an illustrative main screen 500 of the agent management user interface 214. The screen 500 is formatted with a frame 502 displaying a plurality of agents 210 running on the platform 208, or even on other remotely located platforms. A user may select a particular agent from the frame 502 in order to view various details or perform customization of the agent. After making a selection (in this case, clicking on "Storage_Manager"), a properties panel 600 for the selected agent is displayed, as shown in FIG. 6. The user may elect to customize the agent by clicking a "Customize" button 602. Clicking the "Customize" button 602 results in a request for the agent's associated panel 212 being issued to the server 204.

Figure 7A:
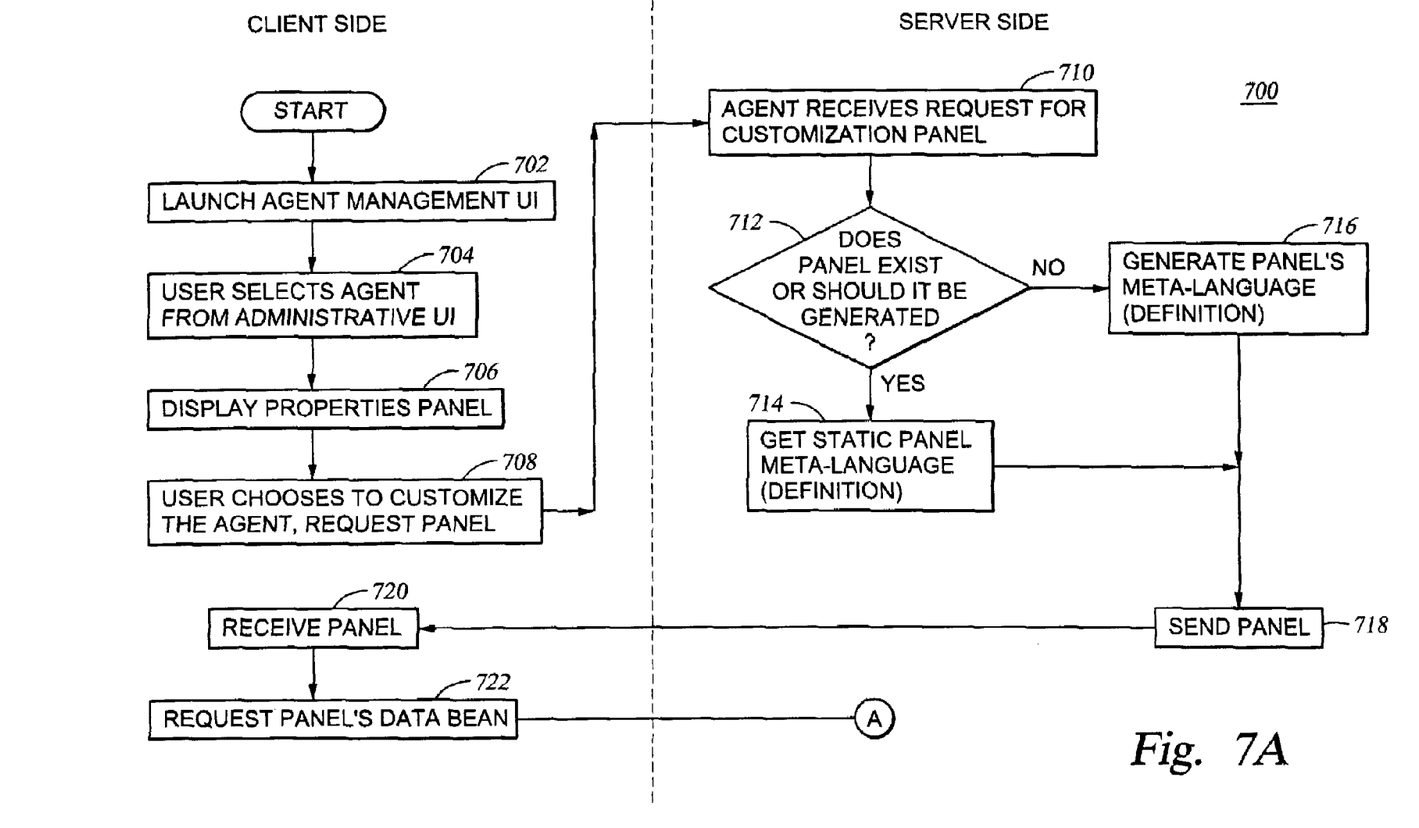
FIG. 7 is a flowchart illustrating the request and presentation of a customization panel.
Figure 7B:
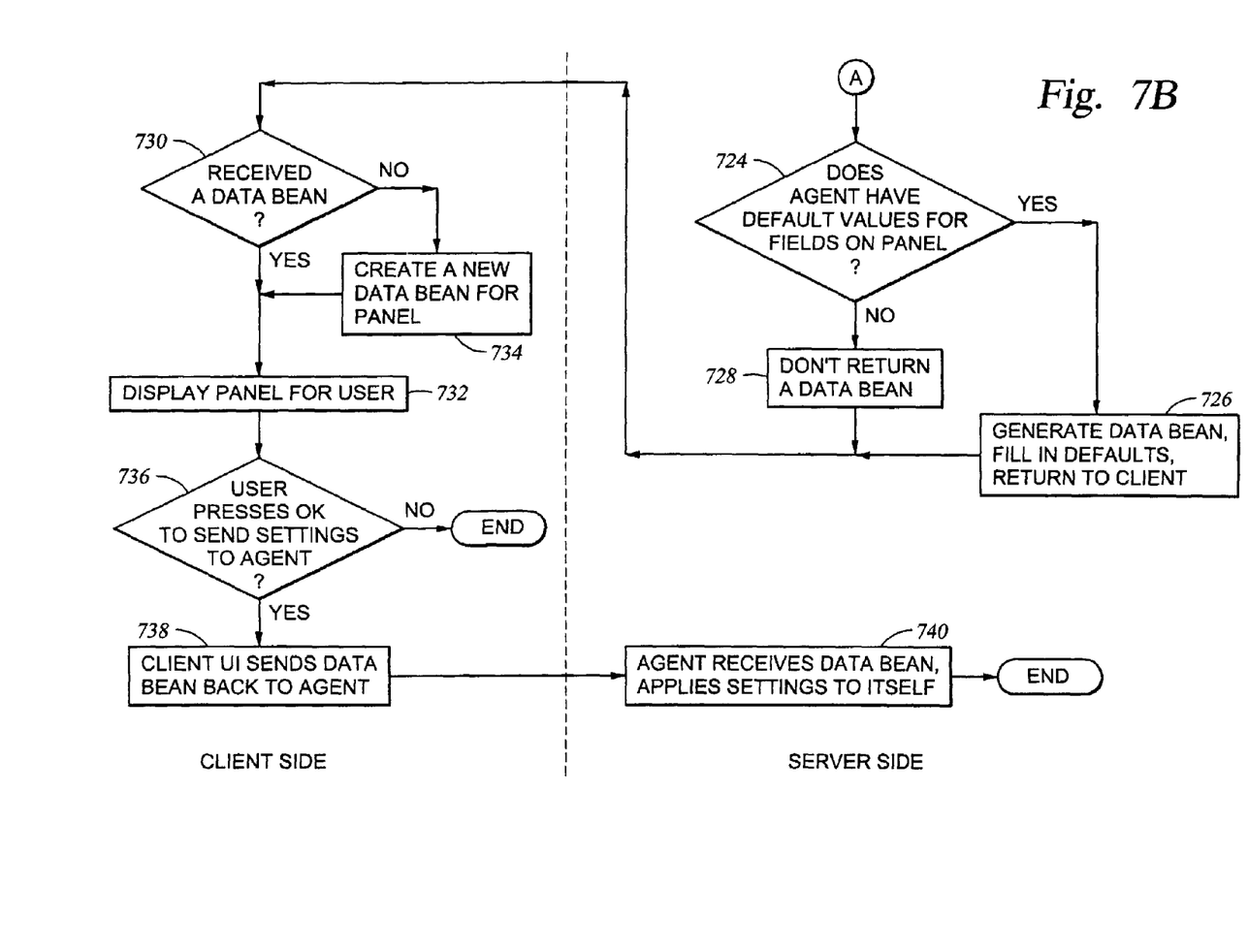

Referring now to FIG. 7, a flow chart illustrating the remote configuration of an agent 210 is shown. Initially, a user launches the agent management user interface 214 (step 702). A representation of the agent management user interface 214 was described above with respect to FIG. 5. A user may select (step 704) a particular agent from the agent management user interface 214 in order to view various details or perform customization of the agent. After making a selection, a properties panel (such as the one shown in FIG. 6) for the selected agent is displayed (step 706). The user may elect to customize the agent by selecting a feature made available in the properties panel (i.e., clicking the "Customize" button 602 of the properties panel 600 shown in FIG. 6). Electing to customize the agent results in a request for the agent's associated panel 212 being issued to the server 204 (step 708). In one embodiment, the customization panel request includes a definition of the user's device. Specifically, the device definition may define a desired display format of the customization panel, as noted above.

Upon receipt of the customization panel request (step 710), the agent determines whether the panel 212 exists or needs to be created (step 712). If the panel exists, the panel (i.e., the panel's definition, or meta-language) is retrieved (step 714). If the panel does not exist, the panel generator 218 is invoked to generate the panel according to intelligence accumulated via the agent's learning engine 220 and provided to the panel generator 218 (step 716). If the request specified a device definition then the panel retrieved/generated is consistent with the device definition. In any case, the panel is then sent to the requesting client (step 718).

Upon receipt of the panel (step 720), the client issues a request for the panel's data bean 216 (step 722). In response to the request for the data bean 216, the corresponding agent determines whether any default values have been assigned for the panel (step 724). If data values have been assigned, the data bean 216 is created, populated with the default values and sent to the client (step 726). Otherwise, no data bean is returned (step 728). In alternative embodiment, a data bean is always employed, whether or not default values are provided. Such an approach may facilitate communication exchanges between clients and a server/agent. That is, receipt of an empty data bean serves to notify the client that its request for default values was processed by the server, even though no default values are specified. It is noted that the separate request for the panel and the data bean is merely an implementation detail that may vary for different embodiments. For example, the data bean may be sent automatically (if available for the particular agent being customized) upon receipt of the panel request (at step 710). Further, the data bean is merely one convenient means of transporting default settings and agent configuration settings between the client and server. Persons skilled in the art will recognize other embodiments equally within the scope of the invention.

If a data bean for the previously received panel is received by the client (step 730), the panel is rendered (which includes populated in the panel with the default settings contained in the data bean) and displayed to the user (step 732). If no data bean is received (step 730), then the client first creates a data bean (step 734) before rendering and displaying the panel (step 732). Illustrative configuration panels were described above with reference to FIGS. 3 and 4.

Once a panel is displayed, a user is permitted to make the desired customization changes for the corresponding agent. If the user confirms the selected settings (step 736), the data bean containing the selected settings is sent by the agent management user interface 214 back to the server (step 738), and more particularly to the appropriate agent. Upon receiving the data bean, the agent applies the settings to itself (step 740).

Figure 8:
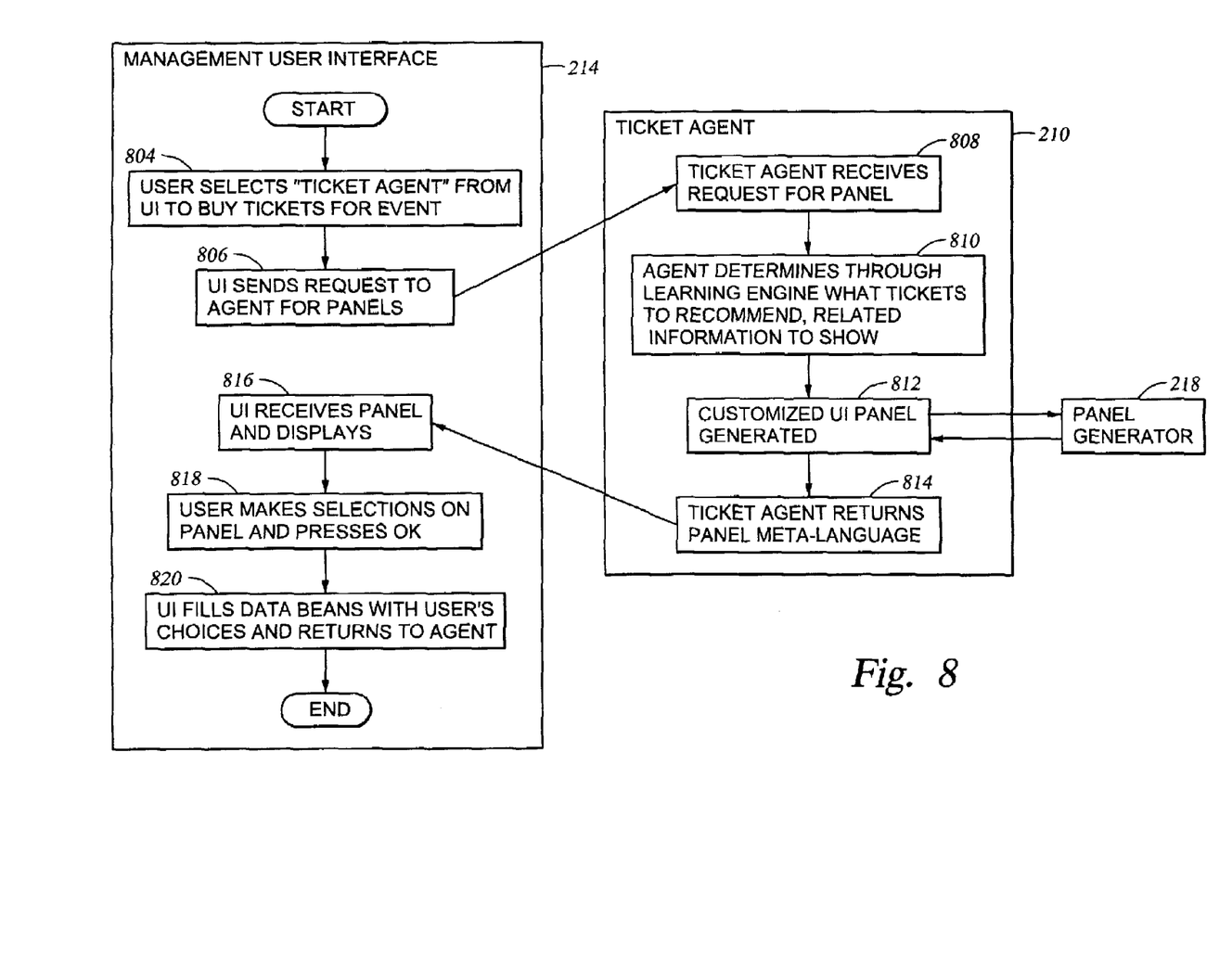
FIG. 8 is a flowchart illustrating the interaction between an agent and a user, interfacing with the agent through a user interface.

Referring now to FIG. 8, a particular illustration of the interaction between an agent 210 and a user is shown, emphasizing remote configuration and dynamic panel generation. In particular, the agent 210 is a "ticket agent" specifically configured for the selection and purchase of tickets. The user interfaces with the ticket agent 210 through the management user interface 214. Interaction between a user and the agent 210 is initiated by user who selects the agent with which to interact from the management user interface 214. In the present example, the user is interested in selecting and purchasing tickets for an unspecified event. Accordingly, the user selects the ticket agent 210 from the management user interface 214 (step 804). In response to the selection, the management user interface 214 sends a request for the agent's panel(s) (step 806). Upon receipt of the request (step 808), the agent determines (through its learning engine) which tickets to recommend (step 810). For example, the agent may have learned that the particular user making the request has a preference for musicals. Accordingly, the agent may decide to recommend tickets only for musicals. Alternatively, the agent may decide to return recommendations for a variety of genres sorted according to the user's preference (e.g., tickets for musicals being ranked highest). In addition, the agent may retrieve other information which the agent has learned is significant to the user. For example, the user may be a student and consistently requests only tickets for which student discounts are available. Having acquired this knowledge, the agent may apply this information intelligently in determining which results to return to the user. Having determined information to be displayed to the user, the agent then invokes the panel generator 218 to generate the customized panel consistent with the agent's applied knowledge (step 812). The agent then returns the panel's generated meta-data to the user interface 214 (step 814). The user interface 214 receives and displays the panel according to the generated meta-data (step 816). The user is then permitted to make and submit their selections (step 818). The user's selections are placed in a data bean, which is returned to the agent 210 and used by the agent to perform any appropriate further processing, i.e., the purchase of selected tickets. Of course, it is contemplated that additional panels may be generated for the user in order to complete the ticket purchase transaction. Any additional panels may also be dynamically generated according to intelligence acquired through the agent's learning engine.

Figure 9:
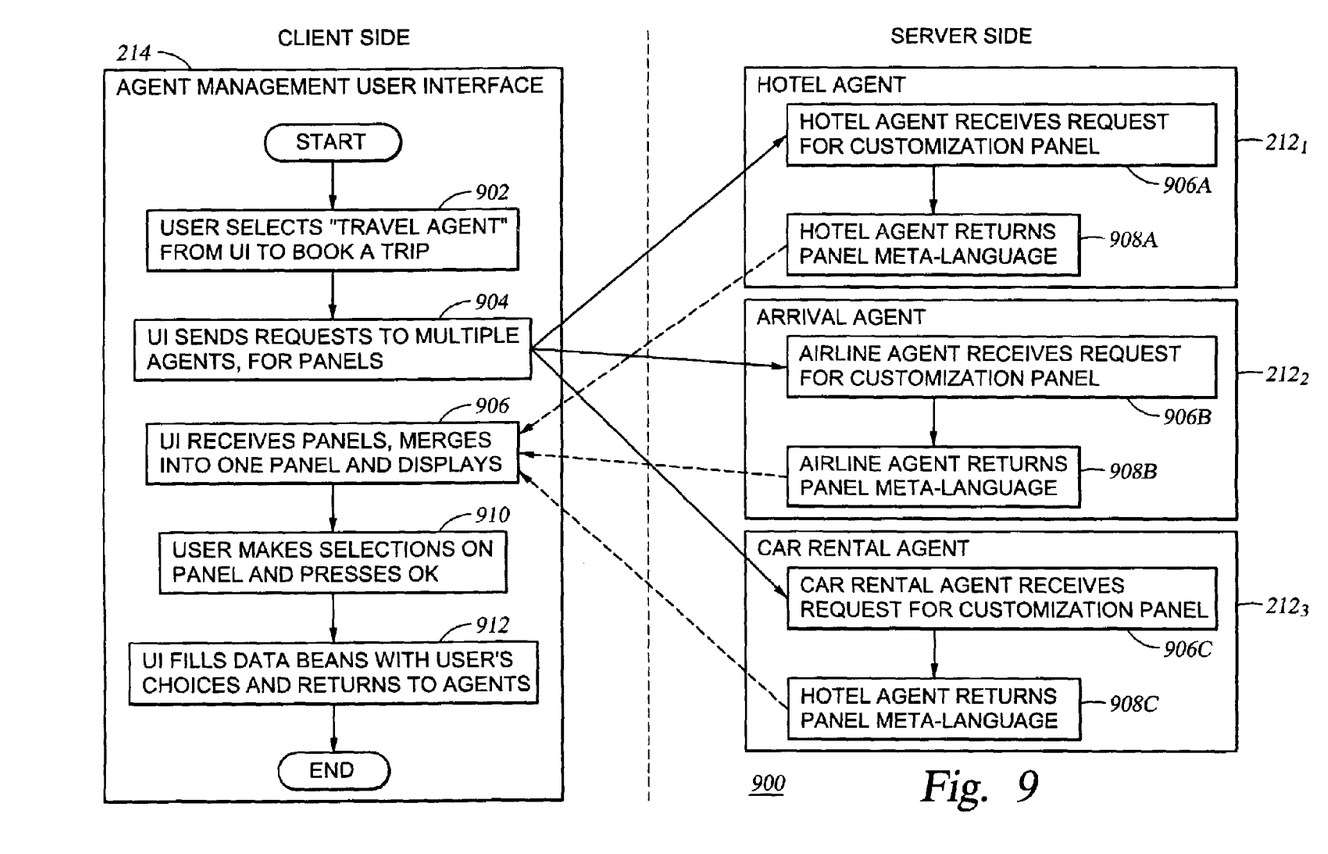
FIG. 9 is a block diagram and flowchart illustrating one embodiment in which a plurality of customization panels (from a plurality of agents) are requested and consolidated to form a single panel.

In practice, the present invention provides for a plurality of functions and features which facilitate interfacing with agents. Some of these features include dynamic generation of panels and remote configuration, which have been described above. Another feature is the merging of panels into a single panel for presentation to a user. Each of these features may be used alone or in tandem. An environment in which each of these features is used together will now be described with reference to FIG. 9. By way of example, FIG. 9 illustrates an environment 900 in which the agent management user interface 214 interfaces with a plurality of agents $210_{1-3}$ which cooperatively facilitate a user's travel arrangements. Accordingly, the plurality of agents includes a hotel agent $210_1$, an airline agent $210_2$, and a car rental agent $210_3$. In operation, a user selects a "travel agent" from the agent management user interface 214 (step 902), where the "travel agent" is a composite of the plurality of agents $210_{1-3}$. In response to the user's selection, the user interface 214 sends a request for the associated panels of each of the plurality of agents $210_{1-3}$ (step 904). Upon receiving the request (steps 906A-C), the agents each return their respective panel definitions (either by generating the panel or retrieving a static panel) to the agent management user interface 214 (steps 908A-C). If available, the agents also provide the user interface 214 with their respective data beans. The agent management user interface 214 then merges the individual panels into a single composite panel, and displays the composite panel to the user. After making the desired selections, the user confirms the selections by, for example, clicking on an "OK" button of the composite panel (step 910). The user's confirmation causes the user interface 214 to store the user's choices to data beans (one for each agent) and then return the data beans to their respective agents.

The operations described with respect to FIG. 9 are merely illustrative of one application for the present invention. Persons skilled in the art will recognize a variety of other real-world applications within the scope of the invention.

While the foregoing is directed to embodiments of the present invention, other and further embodiments of the invention may be devised without departing from the basic scope thereof, and the scope thereof is determined by the claims that follow.

What is claimed is:

1. A method of providing user interfaces for interfacing with intelligent software agents, comprising:

receiving a first request for an user interface for a particular intelligent software agent; and programmatically generating the user interface according to information learned by the particular intelligent software agent, wherein the user interface provides a plurality of agent configuration elements for configuring the particular intelligent software agent.

2. The method of claim 1, further comprising:

receiving, via the user interface, user-selected agent configuration input; and configuring the particular intelligent software agent according to the user-selected agent configuration input.

3. The method of claim 2, further comprising storing the user selected agent configuration input in a common description language.

4. The method of claim 1, wherein programmatically generating the user interface is performed by the particular intelligent software agent.

5. The method of claim 1, further comprising:

receiving a second request for the agent user interface for the particular intelligent software agent; and programmatically generating the user interface according to information learned by the particular intelligent software agent since the first request.

6. The method of claim 5, wherein the user interface generated in response to the first request comprises different agent configuration elements than the user interface generated in response to the second request.

7. The method of claim 5, wherein generating the agent user interface in response to the first and second requests is performed by the particular intelligent software agent.

* * * * *